United States Patent Office 3,382,275
Patented May 7, 1968

---

3,382,275
DERIVATIVES OF GLYOXAL
DITHIOSEMICARBAZONE
Paul Anthony Barrett, London, England, assignor to Burroughs Wellcome & Co. (U.S.A.) Inc., Tuckahoe, N.Y., a corporation of New York
No Drawing. Filed Aug. 10, 1964, Ser. No. 388,717
Claims priority, application Great Britain, Aug. 10, 1963, 31,673/63
10 Claims. (Cl. 260—488)

ABSTRACT OF THE DISCLOSURE

A compound selected from the class consisting of α-acetoxyethyl-glyoxal dithiosemicarbazone, propionoxymethylglyoxal dithiosemicarbazone, propionoxymethylglyoxal di(4-methylthiosemicarbazone), α-propionoxyethyl-glyoxal dithiosemicarbazone, α-propionoxyethyl-glyoxal di(4-methylthiosemicarbazone), isobutyroxymethylglyoxal di(4-methylthiosemicarbazone), α-isobutyroxyethyl-glyoxal dithiosemicarbazone, and α-n-butyroxyethyl-glyoxal dithiosemicarbazone.

---

The present invention relates to biologically active chemical compounds and pharmaceutical preparations thereof.

In particular it relates to derivatives of glyoxal dithiosemicarbazone which have activity against anaplasmosis in cattle, and some of which also have antitumour activity.

The compounds which are active against anaplasmosis are of Formula I

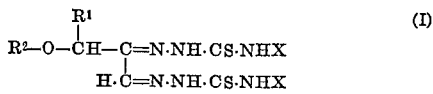

wherein $R^1$ is a methyl group or a hydrogen atom, $R^2$ is an alkyl, benzyl, β-methoxyethyl, or acyl group, and X is an alkyl group or a hydrogen atom. In the above definition, alkyl group means a straight or branched chain alkyl group preferably having 1 to 4 carbon atoms and acyl means formyl or alkylcarbonyl wherein alkyl has the above meaning.

Of the compounds of Formula I, ethoxymethylglyoxal di-(4-methylthiosemicarbazone) (B.W. 216C61), α-ethoxyethylglyoxal dithiosemicarbazone (B.W. 356C61), α-ethoxyethylglyoxal di(4-methylthiosemicarbazone) (B.W. 283C61), and acetoxymethylglyoxal dithiosemicarbazone (B.W. 473C61) have been mentioned in literature, but no activity against anaplasmosis has been ascribed to these compounds.

The remaining compounds of Formula I are believed to be novel and as such are one aspect of the present invention.

The preferred compounds for activity against anaplasmosis are α-(2-methoxyethoxy)ethylglyoxal dithiosemicarbazone (B.W. 776C61), isobutyryloxymethylglyoxal dithiosemicarbazone (B.W. 1024C62), methoxymethylglyoxal dithiosemicarbazone (B.W. 234C61), α-acetoxyethylglyoxal dithiosemicarbazone (B.W. 397C61), and α-n-propoxyethylglyoxal dithiosemicarbazone (B.W. 653C62); particularly preferred are the last three in this list.

The compounds of Formula I wherein X is a hydrogen atom or a methyl group also have activity against certain forms of tumours. Those compounds falling within this type and wherein $R^2$ is an acyl group have certain advantages. These compounds can be denoted by the Formula II

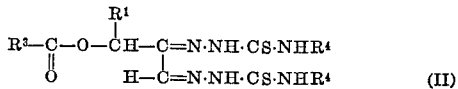

wherein $R^1$ is a hydrogen atom or a methyl group, $R^4$ is a hydrogen atom or a methyl group, and $R^3$ is hydrogen atom or a straight or branched chain alkyl group, preferably of 1–4 carbon atoms. Formula II is embraced by Formula I and so comments applicable to compounds of Formula I will also be applicable to compounds of Formula II.

The α-dithiosemicarbazones of Formula I may be prepared by adaptation of any of the methods known to be useful for converting compounds containing a ketone or aldehyde group into their thiosemicarbazone derivatives. Conveniently they are prepared by reacting in an acid medium two molecular proportions of a thiosemicarbazide of formula $NH_2NH.CS.NHX$ with a glyoxal of formula $R^2OCH(R^1)CO.CHO$ wherein $R^1$, $R^2$, and X have the above defined meanings. The reaction may be effected with heating in a solvent, for example ethanol or aqueous ethanol, preferably in the presence of a trace of mineral acid, for example hydrochloric acid, as a catalyst. The α-dithiosemicarbazones are in general sparingly soluble substances which separate from the hot reaction mixture; after filtration and washing, for example with ethanol and water, and recrystallisation where possible, they are obtained in a pure state.

According to the present invention in another aspect, therefore, there is provided the above described method of preparation of the α-dithiosemicarbazones of Formula I, in so far as they are novel.

Anaplasmosis is a serious systemic disease of cattle which is prevalent in large areas of the Asian, African, Australian, and American continents and certain southern areas of Europe which have a mediterranean type of climate. The infecting anaplasm organism attacks the red blood cells of the cattle characteristically causing anaemia, general debility, and fever of the animal, which often prove fatal. The infecting anaplasm organism has not yet been fully characterised; it may be protozoon but is believed more likely to be related to the rickettsiae.

According to the present invention in another aspect there is provided a method of treating cattle suffering from anaplasmosis, which comprises the administration of a glyoxal dithiosemicarbazone of Formula I.

The compounds may be presented either orally or parenterally.

The natural incubation period for anaplasmosis is about

50–100 days, and the disease is believed only to be of importance in cattle. Thus the smallest animal likely to be treated would be a 7 week old calf, which would not weigh less than about 40–50 kg.; treating such an animal at a dose of about 5 mg./kg. would require 200 mg. but most beasts would require a much bigger dose. The smaller doses are suitable for parenteral administration but a convenient oral dose is of the order of 50 mg./kg. given one or more times daily.

Thus, more particularly, there is provided a method of treating anaplasmosis in cattle which comprises the oral or parental administration of a compound of Formula I in a dose of at least 200 mg.

As stated above, the dithiosemicarbazones of Formula II have also been found to be active against certain tumours and other forms of carcinoma in experimental animals.

For example, the compounds were tested against the Walker Carcinoma in rats both by the oral route and by intraperitoneal injection, and the compounds were considered active if they prolonged the life of treated tumour-bearing rats compared with untreated control rats bearing tumours. All of the compounds of Formula II tested showed some activity against the Walker Carcinoma. Certain of them were also tested against the more resistant tumours Sarcoma 180 and Bagg Mammary Carcinoma in mice. The most active compounds against these tumours were not necessarily the most active against the Walker Carcinoma and the compounds of Formula II having the greatest activity against each tumour are listed below.

The preferred compounds for the activity against the Walker Carcinoma are (397C61) α-acetoxymethyl-, (216C62) propionoxymethyl-, (840C61) α-propionoxyethyl-, (60C63) α-n-butyloxyethyl-, and (645C62) α-isobutyroxyethyl-glyoxal dithiosemicarbazone, and (217C62) α-propionoxymethyl-, (841C61) α-propionoxyethyl-, and (1025C62) isobutyroxymethyl - glyoxal di(4 - methylthiosemicarbazone). These compounds were all effective in prolonging the life of tumour-bearing rats when administered orally at a concentration of 4 mg. or less of drug each day per 100 g. by body weight.

The preferred compounds for the activity against the Sarcoma 180 tumour are (216C62) propionoxymethyl-, (840C61) α-propionoxyethyl-, (60C63) α-n-butyroxyethyl-, and (645C62) α-isobutyroxyethyl-glyoxal dithiosemicarbazone, and (492C61) acetoxymethyl-, (398C61) α-acetoxyethyl-, and (841C61) α-propionoxyethyl-glyoxal di(4-methylthiosemicarbazone). The criterion of activity against Sarcoma 180 was that the size of the tumours of mice which were being treated with these compounds at a daily dose of 8 m./kg. or less in the diet should be 25% or less of the size of the tumours of untreated controls. Some of the compounds were also found to be active when administered by intraperitoneal injection.

Thus, by taking the activities against the Walker Carcinoma and the Sarcoma 180 tumour together the preferred compounds are (216C62) propionoxymethyl-, (840C61) α-propionoxyethyl-, (60C63) α-n-butyroxyethyl-, and (645C62) α-isobutyroxyethyl-glyoxal dithiosemicarbazone, and (492C61) acetoxymethyl- (398C61) α-acetoxyethyl-, and (841C61) α-propionoxyethyl-glyoxal di(4-methylthiosemicarbazone).

The preferred compounds for the activity against the Bagg Mammary Carcinoma are (217C62) propionoxymethylglyoxal di(4-methylthiosemicarbazone) and (1024C62)

isobutyroxymethylglyoxal di(4 - methylthiosemicarbazone).

Thus in yet another aspect the present invention provides a method for the treatment of tumours or the prevention of uninhibited cell division in mammals by the administration of a compound of Formula II. Based on pharmacological experiments the dose is in the range 1.5 mg. per 100 g. of body weight up to the dosage where toxicity considerations become important.

The compounds of Formula I and II may be presented in a pharmaceutical formulation for oral or parenteral administration. For example, the oral preparations may be tablets, capsules, granules, powder, suspension, solutions, or emulsions which may contain diluents, binding agents, dispersing agents, surface-active agents, lubricating agents, coating materials, flavouring agents, colouring agents, solvents, thickening agents, suspending agents, or other pharmaceutically acceptable additives, and these preparations may be presented in unit-dose form or multi-dose form or as additives to feed-stuffs. The injectable form may be an aqueous or non-aqueous solution, suspension, or emulsion in a pharmaceutically acceptable liquid or mixture of liquids, which may contain bacteriostatic agents, antioxidants, buffers, solutes to render the solution isotonic with the blood, thickening agents, suspending agents, or other pharmaceutically acceptable additives. Such preparations are presented in unit dose forms such as ampoules or disposable injection devices, or in multi-dose forms such as a bottle from which the appropriate doses may be withdrawn. All such preparations should preferably be rendered sterile.

Thus in another aspect the invention provides pharmaceutical preparations containing a compound of Formula I.

For administration of a compound of Formula I to cattle for the treatment of anaplasmosis a particularly preferred oral preparation is a drench containing a suspension of dispersible powder; alternatively the preparation may be presented for parenteral use. As stated above the dose should be at least 200 mg.

Thus in particular there are provided pharmaceutical preparations containing at least 200 mg. of a compound of Formula I, suitable for administration either orally or parenterally to cattle.

For the treatment of tumours, particularly in humans, any of the standard pharmaceutical preparations for oral or parenteral use will be acceptable.

The pharmaceutical preparations may be prepared by any of the standard methods of pharmacy. Thus in yet one further aspect the present invention provides a method of making a pharmaceutical preparation containing a compound of Formula I which comprises the incorporation of the compound into the preparation by known techniques. The invention will now be described with reference to the following examples.

EXAMPLE I

A solution of β-methoxy-α-ketopropionaldehyde (2.5 g.) in ethanol (20 ml.) was added to a hot solution of thiosemicarbazide (4.55 g.) in a mixture of ethanol (10 ml.), water (20 ml.), and concentrated hydrochloric acid (2 drops). The mixture was boiled under reflux for 15 minutes and then cooled. The methoxymethylglyoxal dithiosemicarbazone (B.W. 234C61) was filtered off, washed with water and ethanol, and dried. After recrystallisation from aqueous ethanol it had M.P. 220° C. with decomposition.

The following compounds were prepared similarly. In the table below Me, Et, n-Pr, i-Pr, and Ph mean methyl, ethyl, normal-propyl, iso-propyl, and phenyl respectively. All the compounds melted with decomposition.

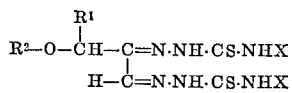

$$R^2-O-\underset{\underset{H-C=N\cdot NH\cdot CS\cdot NHX}{|}}{\overset{\overset{R^1}{|}}{CH}}-C=N\cdot NH\cdot CS\cdot NHX$$

| Example | B.W. ref. No. | R² | R¹ | X | Melting point in ° Celsius. | Solvent for recrystallisation |
|---|---|---|---|---|---|---|
| 2 | 235C61 | Me | H | Me | 197 | Ethanol. |
| 3 | 654C61 | Me | H | i-Pr | 218 | Do. |
| 4 | 271C61 | Me | Me | H | 209–210 | Aqueous ethanol. |
| 5 | 272C61 | Me | Me | Me | 218–219 | Ethanol. |
| 6 | 215C61 | Et | H | H | 299 | Aqueous ethanol. |
| 7 | 216C61 | Et | H | H | 205 | Ethanol. |
| 8 | 407C61 | Et | H | i-Pr | 196 | Do. |
| 9 | 356C61 | Et | Me | H | 204 | Water. |
| 10 | 283C61 | Et | Me | Me | 205 | Ethanol. |
| 11 | 433C61 | Et | Me | i-Pr | 171 | Do. |
| 12 | 991C62 | n-Pr | H | H | 248 | |
| 13 | 992C62 | n-Pr | H | Me | 200 | Do. |
| 14 | 653C62 | n-Pr | Me | H | 211½–212 | Aqueous ethanol. |
| 15 | 644C62 | n-Pr | Me | Me | 142–144 | Ethanol. |
| 16 | 1022C62 | i-Pr | H | H | 248 | |
| 17 | 1023C62 | i-Pr | H | Me | 208–209 | Do. |
| 18 | 647C62 | i-Pr | Me | H | 206–207 | Aqueous ethanol. |
| 19 | 648C62 | i-Pr | Me | Me | 148–150½ | Do. |
| 20 | 674C61 | MeOCH₂CH₂ | H | H | 216 | |
| 21 | 675C61 | MeOCH₂CH₂ | H | Me | 195 | |
| 22 | 776C61 | MeOCH₂CH₂ | Me | H | 218 | |
| 23 | 473C61 | MeCO | H | H | 222 | Aqueous ethanol. |
| 24 | 492C61 | MeCO | H | Me | 192 | Ethanol. |
| 25 | 493C61 | MeCO | H | i-Pr | 164 | Do. |
| 26 | 397C61 | MeCO | Me | H | 216 | Aqueous ethanol. |
| 27 | 398C61 | MeCO | Me | Me | 186 | Ethanol. |
| 28 | 216C62 | EtCO | H | H | 219 | |
| 29 | 217C62 | EtCO | H | Me | 179 | Do. |
| 30 | 840C61 | EtCO | Me | H | 202 | Aqueous ethanol. |
| 31 | 841C61 | EtCO | Me | Me | 179 | Ethanol. |
| 32 | 654C62 | n-PrCO | H | H | 216–217 | |
| 33 | 9C63 | n-PrCO | H | Me | 178–180 | Aqueous ethanol. |
| 34 | 1024C62 | i-PrCO | H | H | 215 | |
| 35 | 1025C62 | i-PrCO | H | Me | 175 | Ethanol. |
| 36 | 645C62 | i-PrCO | Me | H | 205½–206½ | Aqueous ethanol. |
| 37 | 646C62 | i-PrCO | Me | Me | 168–170 | Do. |
| 38 | 60C62 | n-PrCO | Me | H | 191 | Ethanol. |
| 39 | 61C63 | n-PrCO | Me | Me | 158 | Aqueous ethanol. |
| 40 | 797C61 | PhCH₂ | Me | H | 207 | Aqueous ethanol. |

EXAMPLE 41

The intermediate β-acetoxy-α-ketopropionaldehyde was used in Examples 23, 24 and 25. It is a novel compound, was prepared from acrolein, and has B.P. 80–75° C./15 mm. Hg.

EXAMPLE 42

Tablets of ethoxymethylglyoxal-di(4-methylthiosemicarbazone) were made by granulating the compound (0.5 g.) in a fine powder with gelatin in alcohol and water, adding magnesium stearate (0.005 g.) as a lubricant, and compressing the mixture directly.

EXAMPLE 43

Tablets of ethoxymethylglyoxal - di(4-methylthiosemicarbazone) were made by mixing the compound with a diluent (lactose), a dispersing agent (starch), and a surface active agent (polyoxyethylene sorbitan monolaurate). The mixture was granulated with a 5.0% starch mucilage, dried, mixed with a lubricating agent (magnesium) and compressed.

| | Gm. |
|---|---|
| Ethoxymethylglyoxal - di(4 - methylthiosemicarbazone) | 0.25 |
| Lactose | 0.25 |
| Starch | 0.05 |
| Poloxyethylene sorbitan monolaurate | 0.005 |
| Magnesium stearate | 0.005 |

I claim:
1. α-Acetoxyethylglyoxal dithiosemicarbazone.
2. Propionoxymethylglyoxal dithiosemicarbazone.
3. α-Propionoxyethylglyoxal dithiosemicarbazone.
4. α-n-Butyroxyethylglyoxal dithiosemicarbazone.
5. α-Isobutyroxyethylglyoxal dithiosemicarbazone.
6. Propionoxymethyl-glyoxal di(4 - methylthiosemicarbazone.
7. α-Propionoxyethyl - glyoxal di(4-methylthiosemicarbazone).
8. Isobutyroxymethyl - glyoxal di(4 - methylthiosemicarbazone).
9. A compound selected from the class consisting of α-acetoxyethyl-glyoxal dithiosemicarbazone, propionoxymethyl-glyoxal dithiosemicarbazone, propionoxymethyl-glyoxal di(4-methylthiosemicarbazone), α-propionoxyethyl-glyoxal dithiosemicarbazone, α-propionoxyethyl-glyoxal di(4-methylthiosemicarbazone), isobutyroxymethyl-glyoxal di(4-methylthiosemicarbazone), α-isobutyroxyethyl-glyoxal dithiosemicarbazone and α-n-butyroxyethyl-glyoxal dithiosemicarbazone.
10. A compound selected from the class consisting of α-acetoxyethyl-glyoxal dithiosemicarbazone, propionoxymethyl-glyoxal dithiosemicarbazone, propionoxymethyl-glyoxal di(4-methylthiosemicarbazone), α-propionoxyethyl-glyoxal dithosemicarbazone, isobutyroxymethyl-glyoxal di(4-methylthiosemicarbazone), α-isobutyroxyethyl-glyoxal dithiosemicarbazone and α-n-butyroxyethyl-glyoxal dithiosemicarbazone.

References Cited

French et al.: Cancer Research, vol. 18, No. 11 (1958), page 1290.

Michaels et al.: Chemical Abstracts, vol. 59 (1963), col. 9219g.

French et al.: Cancer Research, vol. 20, No. 7 (1960), page 508.

HENRY R. JILES, *Primary Examiner.*

Notice of Adverse Decision In Interference

In Interference No. 96,884 involving Patent No. 3,382,275, P. A. Barrett, DERIVATIVES OF GLYOXAL DITHIOSEMICARBAZONE, final judgment adverse to the patentee was rendered July 27, 1972, as to claims 1, 3, 4, 5, 9 and 10.

[*Official Gazette January 16, 1973.*]